(12) United States Patent
Pearson et al.

(10) Patent No.: US 11,951,945 B1
(45) Date of Patent: *Apr. 9, 2024

(54) NFC-BASED ENCLOSURE ACCESS USING PASSIVE ENERGY HARVESTING

(71) Applicant: Enterprise Electronics LLC, Madison Heights, MI (US)

(72) Inventors: David J. Pearson, Bruce Township, MI (US); Jeffrey Carl Vogel, Troy, MI (US)

(73) Assignee: Enterprise Electronics, LLC, Madison Heights, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/339,491

(22) Filed: Jun. 22, 2023

Related U.S. Application Data

(63) Continuation-in-part of application No. 17/945,446, filed on Sep. 15, 2022, now Pat. No. 11,741,767, which is a continuation-in-part of application No. 17/526,318, filed on Nov. 15, 2021, now Pat. No. 11,713,022.

(60) Provisional application No. 63/116,345, filed on Nov. 20, 2020.

(51) Int. Cl.
| | |
|---|---|
| *B60R 25/24* | (2013.01) |
| *B60R 25/01* | (2013.01) |
| *B60R 25/20* | (2013.01) |
| *B60R 25/40* | (2013.01) |
| *G07C 9/00* | (2020.01) |

(52) U.S. Cl.
CPC ............ *B60R 25/245* (2013.01); *B60R 25/01* (2013.01); *B60R 25/209* (2013.01); *B60R 25/40* (2013.01); *G07C 9/00309* (2013.01); *B60R 2325/103* (2013.01); *G07C 2009/00325* (2013.01)

(58) Field of Classification Search
CPC ... B60R 25/24; B60R 25/01; B60R 2325/101; B60R 2325/103; H02J 50/001; H02J 7/345; H02J 2207/20; H02J 2207/50; H04W 4/80; H04W 12/06
See application file for complete search history.

(56) References Cited

U.S. PATENT DOCUMENTS

| | | | | |
|---|---|---|---|---|
| 9,162,648 | B1 * | 10/2015 | Weng | G07C 9/00182 |
| 9,473,214 | B2 * | 10/2016 | Awad | H04B 5/0037 |
| 10,680,677 | B2 * | 6/2020 | Wobak | H04B 5/0056 |
| 10,909,785 | B2 * | 2/2021 | Magner | B60R 25/24 |

(Continued)

*Primary Examiner* — Brian E Miller
(74) *Attorney, Agent, or Firm* — Quinn IP Law

(57) ABSTRACT

A near-field communication (NFC) entry device provides remote keyless entry (RKE) into an enclosure having an RKE control unit, a door, and a door actuator. The NFC entry device includes a housing and a printed circuit board assembly (PCBA). The housing mounts to the enclosure. The PCBA is enclosed within a cavity of the housing, and includes first and second surfaces, an RF antenna and an inductor coil connected to the first surface, and an NFC communication chipset connected to the second surface. The NFC entry device passively harvests energy from a battery powered mobile device via the inductor coil and stores the energy in the capacitor. The passively harvested energy is used to communicate a control signal to the RKE control unit, via the RF antenna, which activates the door actuator. A standby battery may be used when the capacitor is insufficiently charged.

20 Claims, 7 Drawing Sheets

(56) References Cited

U.S. PATENT DOCUMENTS

| | | | |
|---|---|---|---|
| 2004/0107028 A1* | 6/2004 | Catalano | B64D 45/0059 701/2 |
| 2007/0142988 A1* | 6/2007 | Ziehr | B60Q 3/80 701/49 |
| 2014/0235162 A1* | 8/2014 | Gallo | H04W 52/0229 455/41.1 |
| 2016/0358396 A1* | 12/2016 | Spiess | H04B 5/0031 |
| 2017/0050616 A1* | 2/2017 | Liubakka | H01Q 1/2291 |
| 2017/0085128 A1* | 3/2017 | Garcia Briz | B60L 53/62 |
| 2018/0245559 A1* | 8/2018 | Kang | G07C 9/00174 |
| 2019/0006891 A1* | 1/2019 | Park | H02J 50/80 |
| 2019/0047514 A1* | 2/2019 | Brombach | B60R 25/23 |
| 2020/0087954 A1* | 3/2020 | Sy | B60R 25/24 |
| 2020/0184751 A1* | 6/2020 | Salter | G06F 3/0416 |
| 2020/0216030 A1* | 7/2020 | Craciun | H02J 7/35 |
| 2020/0318401 A1* | 10/2020 | Sy | E05B 81/46 |
| 2020/0383873 A1* | 12/2020 | Dejonge | A61J 7/0481 |
| 2020/0401867 A1* | 12/2020 | Dehmubed | G06K 19/07722 |
| 2021/0027558 A1* | 1/2021 | Elangovan | H04W 4/80 |
| 2021/0342557 A1* | 11/2021 | Springer | H04W 4/80 |
| 2021/0370877 A1* | 12/2021 | Peterson | B60R 25/246 |
| 2022/0101992 A1* | 3/2022 | Porter | H01Q 1/2225 |
| 2022/0108120 A1* | 4/2022 | Van Wiemeersch | G07C 9/00563 |
| 2022/0192008 A1* | 6/2022 | Ahmed | B60R 25/20 |

* cited by examiner

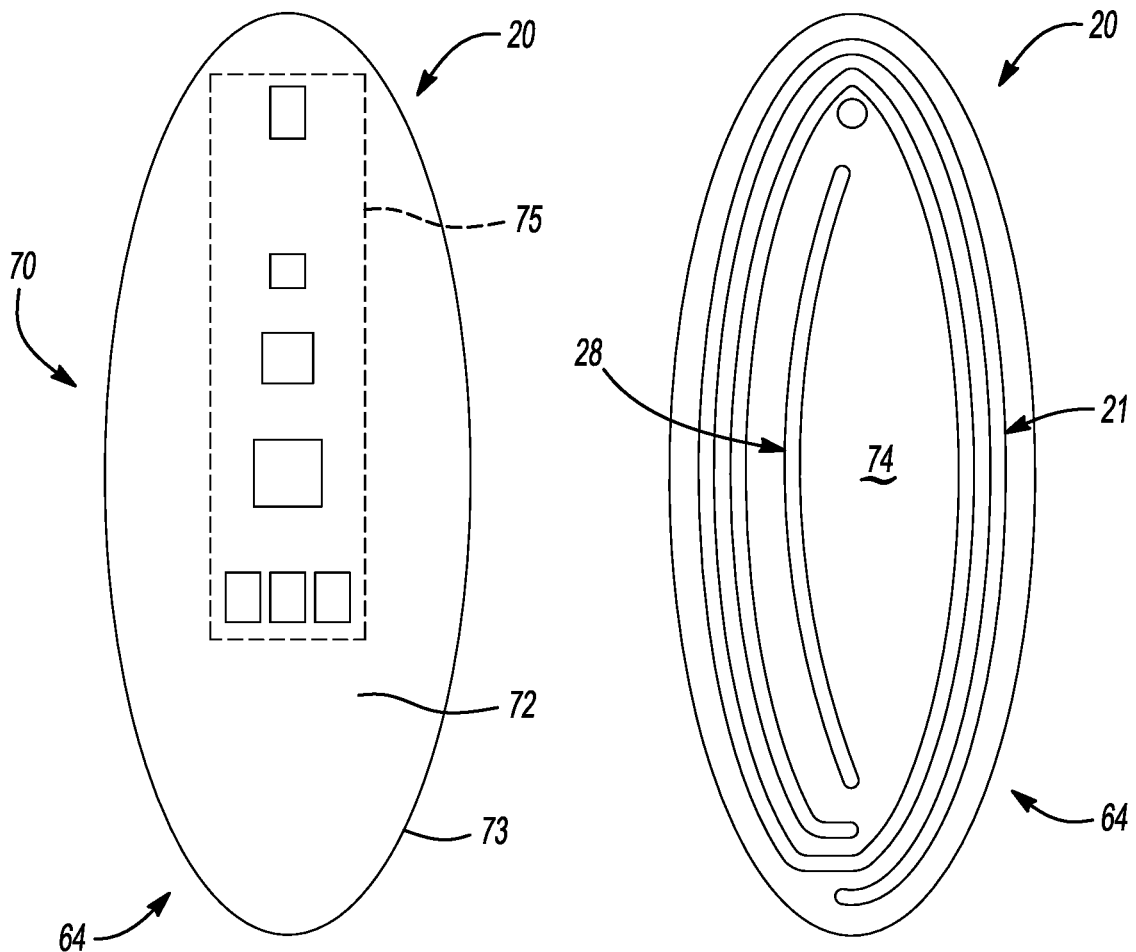
*Fig-8A*  *Fig-8B*
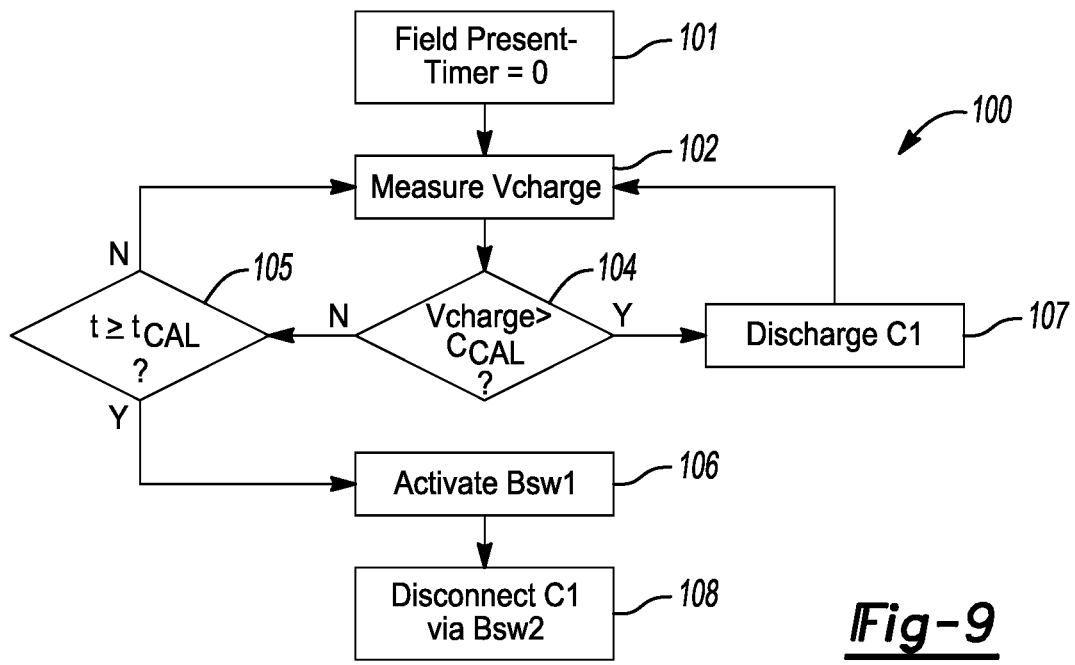
*Fig-9*

NFC-BASED ENCLOSURE ACCESS USING PASSIVE ENERGY HARVESTING

CROSS-REFERENCE TO RELATED APPLICATIONS

This application is a Continuation-In-Part of U.S. patent application Ser. No. 17/945,446 filed on Sep. 15, 2022, which is a Continuation-In-Part of U.S. patent application Ser. No. 17/526,318 filed on Nov. 15, 2021, which claims the benefit of priority to U.S. Provisional Application No. 63/116,345 filed on Nov. 20, 2020, all of which are hereby incorporated by reference in their respective entireties.

INTRODUCTION

The present disclosure relates to wireless near-field communication (NFC) by a smartphone or another suitably configured mobile device with a remote keyless entry (RKE) system, for the purpose of accessing a secured enclosure. As understood in the art, RKE refers to the wireless operation of an electromechanical locking system or other access control mechanism using radio frequency (RF) energy transmission and associated wireless communication protocols. NFC in particular is an open-platform, short-range wireless technology operating at a frequency of 13.56 MHz over very short transmission distances, typically on the order of about 5-10 centimeters (5 cm). Due to its limited range, NFC is generally less susceptible to signal interception and degradation relative to longer-range wireless transmissions.

Key fobs are used alone or in conjunction with an alphanumeric keypad to enable a user to access a locked enclosure, such as a motor vehicle, a garage, a residence, or an office. While a key fob is portable, an alphanumeric keypad housing is typically affixed to an accessible surface of the enclosure, such as to a B-pillar of a motor vehicle or to a wall immediately adjacent to a garage door or entry door. A battery-powered microcontroller located within the keypad housing is coupled to the individual alphanumeric keys of the keypad, as well as an RF transmitter operating within a defined bandwidth.

A door to the enclosure may be connected to an electromechanical door actuator, the operation of which is controlled by an associated RKE control unit. Entry of a particular key sequence produces corresponding low-voltage signals representing a corresponding entry code, with the entry code thereafter transmitted to a receiver of the RKE control unit. The door actuator is energized when the transmitted entry code correctly matches a predetermined entry code. From the perspective of the RKE control unit and its receiver, therefore, the keypad appears and functions as another key fob.

As appreciated in the art, an NFC chipset may be integrated into the circuitry of modern smartphones, tablet computers, laptop computers, and other mobile devices. NFC-enabled mobile devices typically utilize an active device/reader in conjunction with a passive device or RF tag. The RF tag, which contains an RF antenna and a small amount of resident memory, is powered by a magnetic field emanating from the reader. Interaction of the reader and the RF tag thus enables touch-free or quick-touch/quick-tap communication to occur between the reader and the proximate RF tag, e.g., between a credit card and a card reader at a point of sale, or between two compatible NFC-equipped smartphones. Likewise, some smartphones are configured to selectively operate as key fobs by directly communicating with a receiver of an RKE system when a user enters a predetermined entry code using a virtual keypad of the smartphone.

SUMMARY

Disclosed herein are control strategies and associated hardware systems for providing remote keyless entry (RKE)-based access to a locked or otherwise secured enclosure. Access is provided using a passive near-field communication (NFC) entry device mounted to the enclosure, either alone, as an alternative to a separate alphanumeric keypad affixed to the enclosure, or integrated into such a keypad. The disclosed strategy includes passively harvesting available battery energy from a proximate NFC-equipped smartphone or other active, battery-equipped NFC-equipped mobile device. The harvested energy from the mobile device is thereafter used to situationally power an RF transmitter, e.g., an ultra-high frequency (UHF) RKE transmitter or a Bluetooth Low Energy (BLE) transmitter in different embodiments, which in turn is housed within the NFC entry device, with the NFC entry device constructed as set forth in detail herein.

The NFC entry device, which is characterized in some embodiments by an absence of a cellular or other physical electrochemical battery, with other embodiments including a permanent standby battery for situational use when field strength is relatively weak and thus when charging of an onboard capacitor would be unduly delayed, is coupled to an onboard RKE control unit located on or within the above-noted enclosure. Once the RF transmitter has been energized, the RF transmitter communicates wirelessly with the onboard RKE control unit. The RKE control unit responds to control signals communicated by the NFC entry device by commanding a particular local control action, e.g., energizing an electromechanical door actuator or locking mechanism of a door, trunk, or other access panel.

According to a non-limiting exemplary embodiment, the NFC entry device provides RKE-based access into the enclosure. The enclosure includes the resident RKE control unit, a closure panel/door, and a door actuator operatively connected to a door. The NFC entry device may include a housing configured to mount to a surface of the enclosure and defining a cavity. An NFC chipset of a printed circuit board assembly (PCBA) is enclosed within the defined cavity. As noted above, an alphanumeric keypad could be mounted or connected to the enclosure, e.g., in communication with the RKE control unit or directly to the door actuator, to provide an alternative approach for gaining entry to the enclosure, with the present NFC-based features possibly integrated into such a keypad. In some embodiments, there may be a shared electrical integration between electronics of such a keypad and electronics of the NFC-based chipset.

The PCBA in this particular embodiment includes opposing first and second major surfaces, an RF antenna, and an NFC inductor, with the latter component being connected to the first major surface. An NFC communication chipset is connected to the second major surface. The NFC entry device is configured to passively harvest energy from a proximate NFC-enabled mobile device. This process occurs via the NFC inductor. The harvested energy is used to situationally communicate a control signal to the RKE control unit located within the enclosure. Transmission of the control signal occurs via the RF antenna, and has the effect of energizing or otherwise activating the door actuator.

An NFC entry device for gaining access to the enclosure in a first manner according to another embodiment for RKE into an enclosure includes a housing configured to mount to a surface of the enclosure, with the housing defining a cavity therein. A PCBA is enclosed within the cavity of the housing, and includes NFC chipset inclusive of the RF antenna, the inductor coil, an NFC receiver IC coupled to the inductor coil, a charge storage capacitor coupled to the NFC receiver IC, and a microcontroller connected to the NFC receiver IC and the capacitor. The NFC entry device includes a permanent standby battery. The NFC entry device is configured to passively harvest energy from the NFC-enabled mobile device, via the inductor coil, by operation of the microcontroller. The passively harvested energy is then used to communicate an access control signal to the RKE control unit via the RF antenna to thereby activate the door actuator. When the field strength is relatively weak, this embodiment of the NFC entry device allows the microcontroller to selectively discharge the standby battery to temporarily supply adequate current to an RKE transmitter. Weak field strength could in some instances unduly increase the amount of time needed for energy harvesting and charging, and therefore the optional standby battery may be beneficial for reducing latency. A user could also gain access to the enclosure in a second manner via the aforementioned alphanumeric keypad when the enclosure is equipped with the same.

According to another aspect of the disclosure, a method of unlocking a door of an enclosure having the door, a door actuator, and an RKE control unit includes establishing near-field communication (NFC) between an NFC entry device mounted to the enclosure and an external NFC-enabled mobile device, and confirming, via the NFC device, that the NFC-enabled mobile device is an approved device. In response to confirming that the NFC-enabled mobile device is the approved device, the method includes inducing an electric current in an inductor coil of an NFC chipset of the NFC entry device, via electromagnetic induction, using an NFC signal from the NFC-enabled mobile device. Additionally, the method includes storing energy in a capacitor of the NFC chipset as passively harvested energy, and selectively powering a RF antenna of an RF transmitter chipset using the passively harvested energy or, as needed, using energy stored in the standby battery, to thereby transmit a control signal to the RKE control unit. The control signal is indicative of a request to unlock the door.

An NFC entry device according to another embodiment includes a housing defining a cavity and configured to mount to a body of the vehicle, and a PCBA enclosed within the cavity. The NFC entry device includes an RF transmitter chipset having an RF antenna, the RF transmitter chipset being a UHF chipset or a BLUETOOTH Low-Energy (BLE) chipset. The NFC entry device also includes an inductor coil, an NFC receiver IC coupled to the inductor coil, and including a steering diode and a voltage regulator, a capacitor coupled to the NFC receiver IC, and a DC-DC converter coupled to the capacitor and the microcontroller.

A microcontroller in this exemplary configuration is connected to the NFC receiver IC and the capacitor. The NFC entry device is characterized by an absence of a primary cellular battery, and is configured to passively harvest energy from an NFC-enabled mobile device in proximity to the NFC entry device, via the inductor coil by operation of the microcontroller, and to thereafter use the energy to communicate an access control signal to the RKE control unit via the RF antenna and thereby activate the door actuator. As noted above, the standby battery may be used situationally as needed when the incident field is weak and, as a result, passive energy harvesting and related charging of the capacitor would be delayed. The microcontroller could execute computer-readable instructions from non-transitory memory/storage to determine when to discharge the standby battery and when to discharge the capacitor, as described in detail below.

The above-described features and advantages and other possible features and advantages of the present disclosure will be apparent from the following detailed description of the best modes for carrying out the disclosure when taken in connection with the accompanying drawings.

BRIEF DESCRIPTION OF THE DRAWINGS

FIGS. 8A and 8B are schematic perspective view illustrations of portions of the NFC entry device shown in FIG. 7.

FIG. 9 is a flow chart describing a method for using a standby battery within the circuit of FIG. 5.

Figure 1:
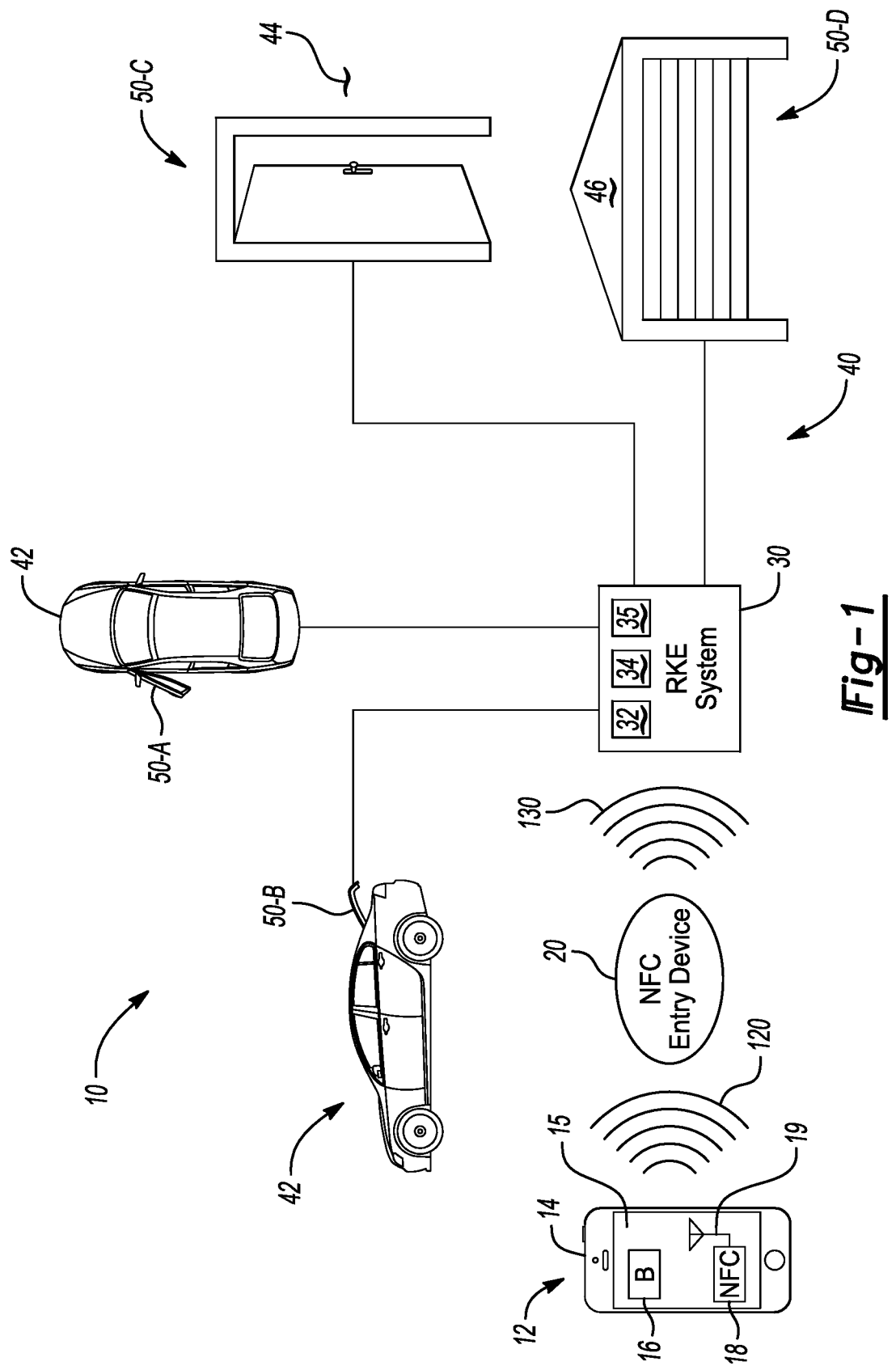
FIG. 1 is a schematic illustration of a near-field communication (NFC)-based communication network according to a representative embodiment, with the NFC-based communication network including an NFC-enabled smartphone, an NFC entry device, and a remote keyless entry (RKE) control unit collectively enabling automatic ingress into an enclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Dimensions disclosed in the drawings or elsewhere herein are for the purpose of illustration.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring to the drawings, wherein like reference numbers refer to like components, a near-field communication (NFC) network 10 is depicted schematically in FIG. 1, with the NFC network 10 having an NFC-enabled mobile device 12. The mobile device 12 may be embodied as an NFC-enabled smartphone as pictured, or as a tablet computer, laptop computer, etc. For illustrative consistency, and due to the portability and programmed capabilities of modern smartphones, the mobile device 12 will be described hereinafter as a smartphone 12 without limitation.

The NFC network 10 also includes an NFC entry device 20 constructed as set forth herein, as well as a remote keyless entry (RKE) system 30. The smartphone 12, the NFC entry device 20, and the RKE system 30 collectively enable automated ingress into one or more locked or otherwise secured enclosures 40. The enclosure 40 may be variously configured as a vehicle 42, e.g., a motor vehicle, an aircraft, or a watercraft. Alternatively, the enclosure 40 may be embodied as a commercial or residential building 44, a garage 46 or other storage facility, or any other accessible closed air or open air structural enclosure.

Ingress into and egress from such an enclosure 40 may be facilitated by operation of an access panel/door, with the configuration and operation thereof varying with the particular use. For instance, the vehicle 42 in a non-limiting motor vehicle embodiment may include one or more side doors 50-A which, when unlocked and opened, permit a driver or passenger of the vehicle 42 to enter or exit a passenger compartment of the vehicle 42. The vehicle 42 may likewise include a trunk or hatchback door 50-B, and/or any number of other closeable and lockable doors (not shown). The enclosure 40, when embodied as the building 44 or the garage 46, may likewise include a respective door 50-C and 50-D. While a few representative examples are depicted in FIG. 1, those skilled in the art will appreciate that other types of doors such as swinging or translating gates, bay doors, etc., may be controlled using the present teachings, and therefore the disclosure is not limited to use with the illustrated enclosures 40. Likewise, the present teachings are not limited to only one type of enclosure 40 as set forth below.

As appreciated in the art, an RKE system such as the representative RKE system 30 depicted schematically in FIG. 1 is a keyless control system configured to activate ingress/egress and other possible functions of the enclosure 40. In keeping with the non-limiting example embodiment of the vehicle 42, such functions may include, in addition to unlocking or locking the door(s) 50-A and/or 50-B, the performance of other control functions such as auto-start, internal and/or external lighting control, horn sounding, etc. The RKE system 30 may perform such functions in response to receipt by a radio frequency (RF) receiver 35 of the RKE system 30 of a control signal 130 from an external device, e.g., a wireless radio signal or a hardwired low voltage signal.

The external device ordinarily would be in the form of an RF key fob and/or a keypad as described generally above, the latter of which could be mounted in proximity to the door(s) 50-A and/or 50-B. In the present approach, however, the control signal 130 arrives in the form of RF signals or activation signals transmitted to an RKE control unit 32 over wired or wireless conductive paths by the present NFC entry device 20. Processing functions occurring within the RKE control unit 32 result in ON/OFF or activated/deactivated state control of the connected door actuator 34, e.g., activation of a linear or rotary actuator or other locking mechanism, with other possible electromechanical actuators used in other embodiments.

By way of example, receipt by the RKE system 30 of the control signal 130 in the form of an "UNLOCK" signal will cause the RKE control unit 32 to command an immediate unlocking of the door(s) 50-A and/or 50-B via activation of the door actuator 34. The actual configuration of the RKE system 30 may vary with the desired application. As an illustration, a cellular battery (not shown) located within the enclosure 40, e.g., a 12V auxiliary battery in the representative vehicle 42 of FIG. 1, a small 3-5V alkaline or lithium ion battery, etc., may be selectively connected via a series of diodes to windings (not shown) of the door actuator 34 to cause a plunger, arm, or other movable locking mechanism thereof to disengage from the door(s) 50-A and/or 50-B. Other embodiments may include rotary actuators, such as chain or belt-driven garage door openers in the example garage door 50-D shown in FIG. 1.

The smartphone 12 is depicted in FIG. 1 with an outer case 14. The outer case 14 contains and structurally supports a touchscreen 15, a rechargeable direct current (DC) lithium ion or other suitable cellular battery (B) 16, an NFC chipset 18, and a transceiver 19. As will be appreciated, NFC protocols use a version of RF identification (RFID) in which information or data is transmitted solely by propagation of RF signals 120 through free space. NFC operates at a frequency of 13.56 MHz, as noted elsewhere above and appreciated in the art, with typical point-to-point data transfer rates of 106 kilobits per second (kbps), 212 kbps, or 424 kbps.

In addition to enabling rapid data transfer, the NFC chipset 18 of the smartphone 12 and the short-range nature of the RF signals 120 emanating from a transceiver 19 of the smartphone 12 also enables the NFC entry device 20, when constructed and controlled as set forth herein, to induce an electrical current within the NFC entry device 20. Using the representative circuit topologies of FIGS. 4 and 5, which are intended to be exemplary of two possible constructions and non-limiting, electromagnetic induction allows passive harvesting of energy to occur within the NFC entry device 20. This occurs at power levels sufficient for temporarily enabling the NFC entry device 20 to situationally communicate with the RKE system 30, such as when unlocking the door(s) 50A, 50-B, 50-C, and/or 50-D, or when performing other possible control functions in the scope of the disclosure.

In other words, the NFC entry device 20 as contemplated herein is "passive" in the sense that the NFC entry device 20 is able to harvest energy from the battery 16 of the smartphone 12 via electromagnetic induction, which in turn enables the NFC entry device 20 to forego use of a cellular battery of its own. However, the present teachings do not preclude use of permanent standby battery when an incident field is relatively weak, i.e., when charging solely via passive energy harvesting may take an extended amount of time, thus forcing a user to wait too long for the enclosure 40 to unlock. In this way, the NFC entry device 20 is characterized by an absence of a primary cellular battery, and thus has the advantage of avoiding various charge-depletion complications typically associated with battery powered devices. The solutions instead function opportunistically primarily using the passive energy harvesting principles described below.

Figure 2:
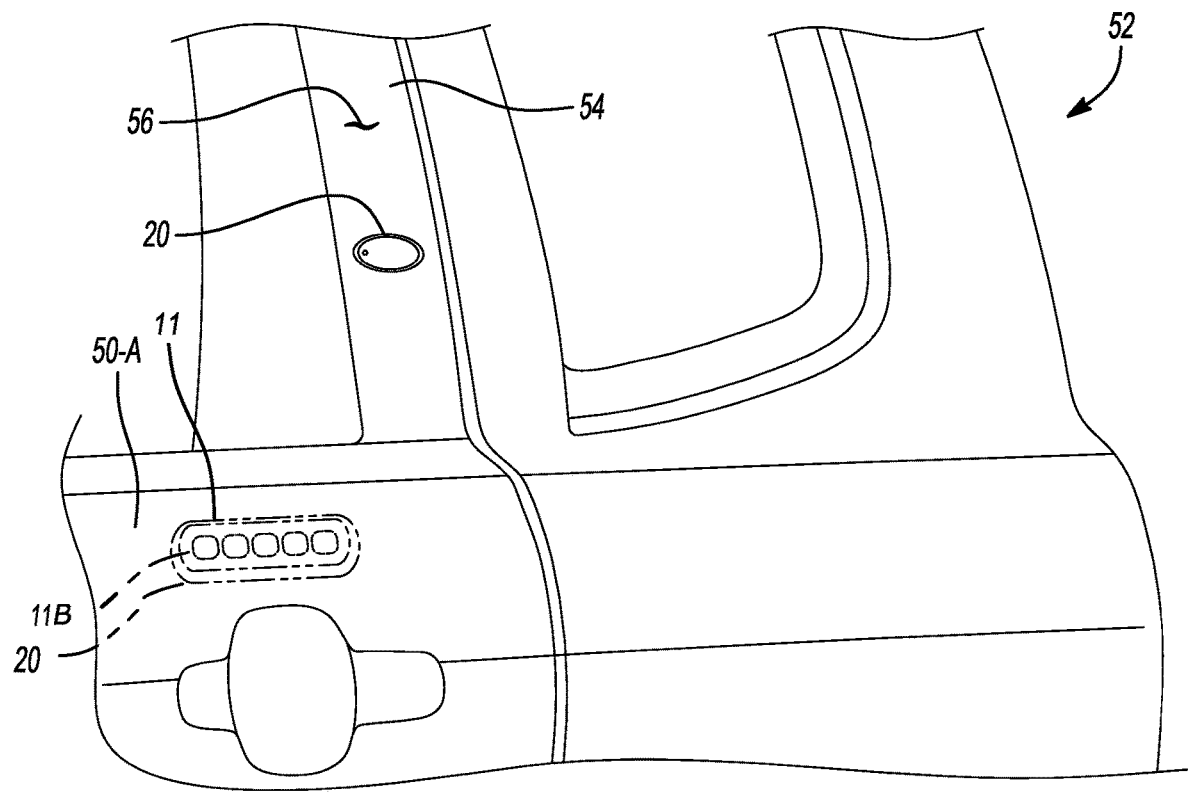
FIGS. 2 and 3 are schematic perspective view illustrations of an exemplary vehicle body depicting optional B-pillar mounting of an NFC entry device in accordance with the disclosure.
Figure 3:
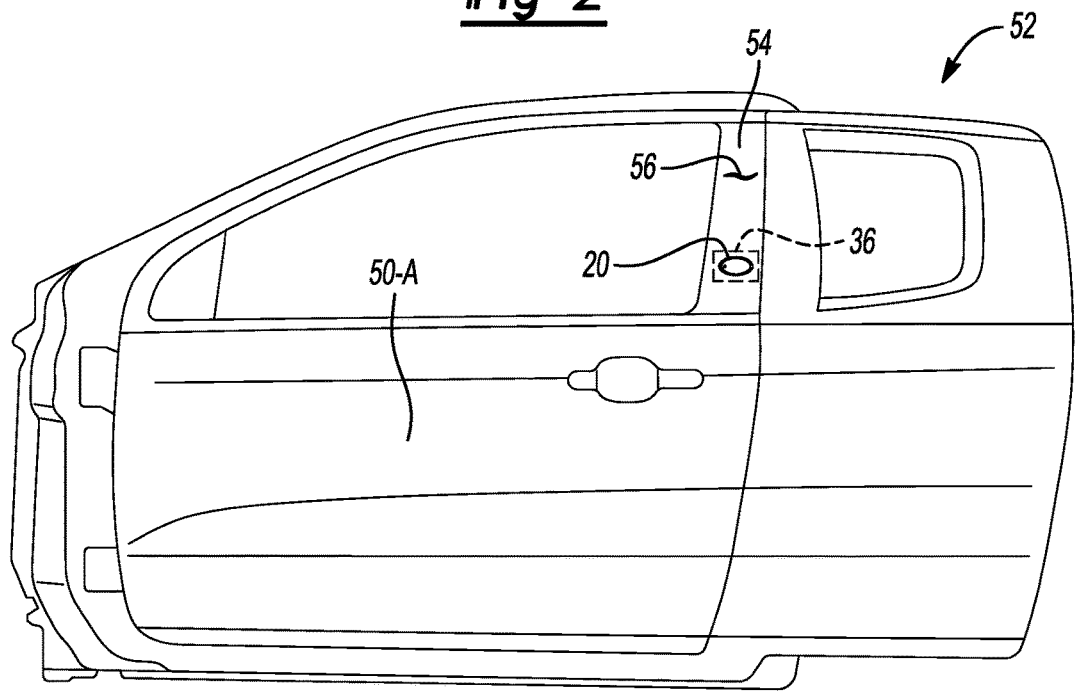

Referring briefly to FIGS. 2 and 3, the NFC entry device 20 of the present disclosure is configured to securely mount to a surface of any of the enclosures 40 shown in FIG. 1. For a motor vehicle embodiment of the vehicle 42 of FIG. 1, for example, the NFC entry device 20 may include affixed to a vehicle body 52 having a B-pillar 54. The B-pillar 54 of a typical motor vehicle is a metal structural support member extending between a roof and floor pan (not shown) of the vehicle 42 just aft of the door 50-A, in this case a driver-side door. An optional alphanumeric keypad 11 may be mounted to the vehicle body 52, e.g., to the door 50-A or the B-pillar 54, to enable a user to gain access to the enclosure 40 in another manner via manual code entry, e.g., via alphanumeric push buttons 11B as appreciated in the art. Within the scope of the disclosure, the NFC entry device 20 could be integrated into the structure of the alphanumeric keypad 11, thus taking advantage of existing packaging space on the vehicle 32. As noted above, some of the electronics of the keypad 11 could be integrated with electronics of the NFC entry device 20, e.g., as shown by the keypad push buttons 11B in FIG. 5. External surfaces of the B-pillar 54 are typically hidden behind a plastic or composite trim cover 56 to provide a finished cosmetic appearance. In a possible embodiment, the NFC entry device 20 of the present disclosure may be installed on the B-pillar 54 behind such a trim cover 56, e.g., with the NFC entry device 20 adhesively bonded to or near the trim cover 56 fully out of view between the sheet metal of the B-pillar 54 and the trim cover 56 connected thereto.

Other embodiments may be envisioned in which the NFC entry device 20 is adhered to a cosmetic "show" surface of the vehicle body 52, e.g., on or adjacent to the trim cover 56 or one or more of the doors 50-A and/or 50-B of FIG. 1, or any of the other doors 50-C or 50-D in non-vehicular embodiments. When the NFC entry device 20 is mounted to such a show surface, the NFC entry device 20 may be contoured, shaped, painted, emblazoned with and/or otherwise configured as a visibly appealing badge, label, or logo 69 (see FIG. 6B).

In non-limiting example constructions, for instance, the NFC entry device 20 may be adhered to the door 50-B of FIG. 1 to act as a trunk logo, e.g., a manufacturer's readily identifiable corporate logo, or in a complementary or matching color when adhered to the side door 50-A or the B-pillar 54 of the vehicle body 52. Construction enabling such attachment is described below with reference to FIGS. 6A-8. Once securely mounted and oriented as described below, the NFC entry device 20 is configured to communicate wirelessly via RF communication with the smartphone 12 and the RKE system 30 as represented in FIG. 1 by RF signals 120 and control signals 130, respectively.

Figure 4:
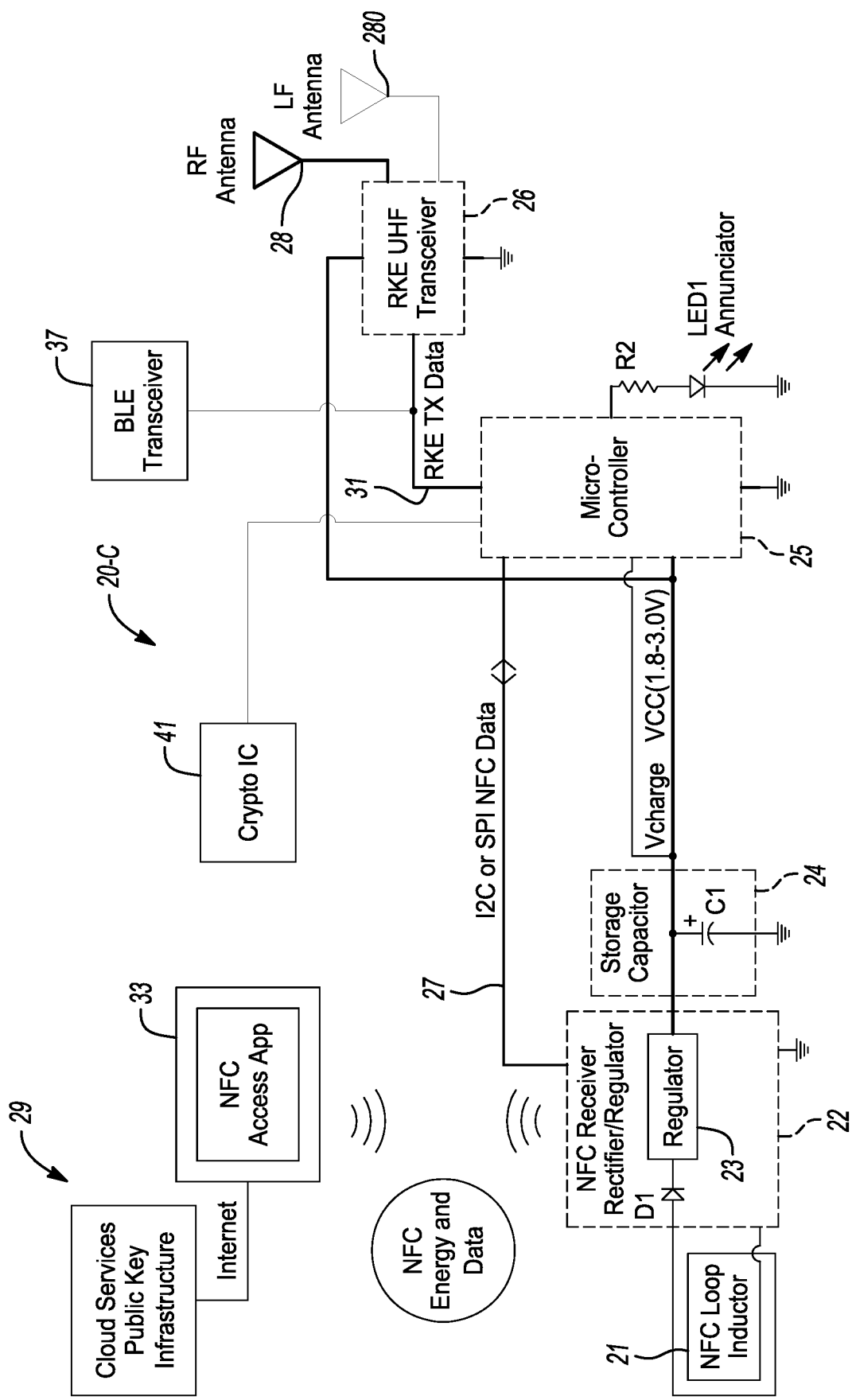
FIGS. 4 and 5 are alternative schematic circuit topologies depicting possible implementations of the above-noted NFC entry device, with FIG. 5 depicting an optional embodiment in which a permanent standby battery is selectively discharged under low field strength conditions to minimize a delay in opening or unlocking the various enclosures of FIG. 1.
Figure 5:
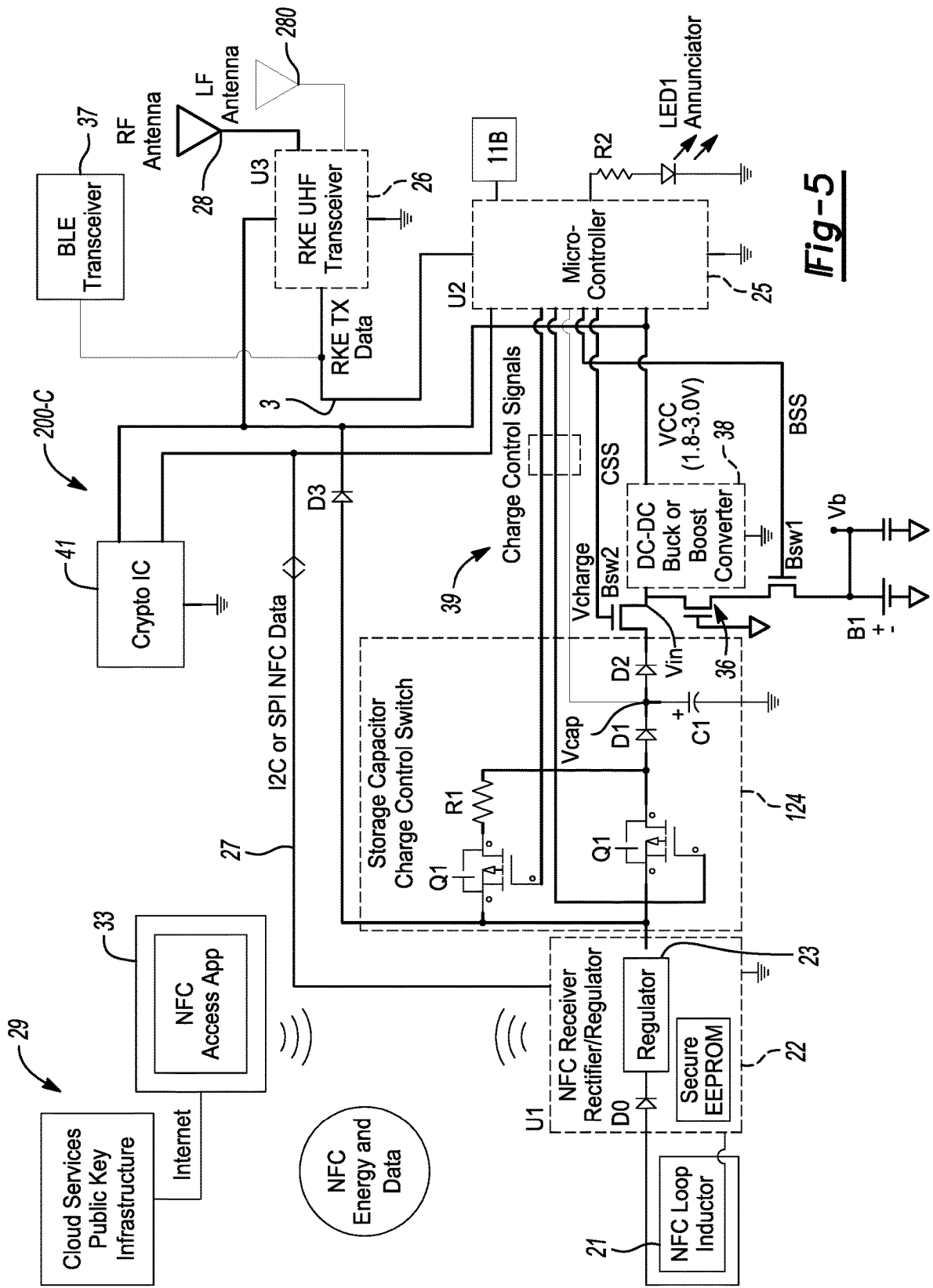

Turning now to FIGS. 4 and 5, the NFC entry device 20 described generally above includes an NFC chipset 20-C (FIG. 4) or 200-C (FIG. 5), both of which are shown schematically for illustrative simplicity and clarity. The NFC chipset 20-C of FIG. 4 includes an NFC receiver coil/loop inductor 21, hereinafter referred to as inductor coil 21 for simplicity, which operates at the NFC frequency of 13.56 MHz and coupled to an NFC receiver integrated circuit (IC) 22. The NFC receiver IC 22 may be part of a microcontroller 25 or a separate component, and embodied as an engineered or commercially available NFC Forum Type 5-compliant contactless NFC link IC, such as but not limited to the NTAG® NTP53321 available from NXP Semiconductors N.V. In the illustrated embodiment, push buttons 11B of the optional alphanumeric keypad 11 are connected to or integrated with the microcontroller 25, with other electronics of such a keypad 11 also possibly integrated with electronics of the NFC chipset 20-C or 200-C of FIGS. 4 and 5 in other embodiments. As appreciated in the art, such an NFC link IC may include a voltage regulator 23 in series with a steering diode D1, the latter of which directs an induced current through the accompanying regulator 23.

Downstream of the NFC receiver IC 22, a storage capacitor block (C1) 24, when inductively charged, is configured to store a low charge voltage, e.g., 1.8V-3.0V, and to selectively release the stored energy to the microcontroller 25 by a low-voltage connection 27. With respect to the low-voltage connection 27, possible embodiments may include an inter-integrated circuit (I2C) bus, a serial peripheral interface (SPI) bus, or other suitable connection supporting an NFC-compatible data transfer protocol enabling communication with the microcontroller 25. The microcontroller 25 may be an application-suitable low-power chipset, a system-on-a-chip (SoC), or an application-specific IC (ASIC) configured to control operation of the NFC chipset 20-C when communicating with the onboard RKE control unit 32 of FIG. 1, with the microcontroller 25 coupled to ground via a series resistor (R2) and an LED annunciator (LED1), e.g., a light-emitting diode of a suitable color.

As appreciated in the art, the microcontroller 25 is shown in schematic block diagram form for illustrative simplicity and clarity, with actual architectures including one or more processors/central processing units (CPUs), memory, input/output (I/O) ports and circuitry, analog-to-digital converters (ADCs), high-speed clocks or counters, etc. Exemplary programmable interface controller (PIC)-based microcontrollers such as the PIC16LF series of commercially-available microcontrollers from MICROCHIP TECHNOLOGY INC. may be used in the construction of the NFC chipset 20-C of FIG. 4.

The schematically represented NFC chipset 20-C of FIG. 4 further includes an RKE UHF transmitter chipset 26 coupled to the microcontroller 25 via an RKE transmission (Tx) line 31, itself transmitting RKE Tx data to the RKE UHF transmitter chipset 26. Embodiments of the RKE UHF transmitter chipset 26 may include an ultra-low power RF transceiver operating in the 315 MHz to 902 MHz range or another UHF range, e.g., the commercially-available CMT2300A RF transceiver chipset from CMOSTEK Microelectronics Co., Ltd., or another application-suitable RF transceiver. Alternatively, the NFC chipset 20-C may include a Bluetooth Low Energy (BLE) transmitter chipset 37, e.g., a TiWi-uB1 from LS RESEARCH LLC. Output signals from transmitter chipsets 26 or 37 are radiated via a suitable UHF- or BLE-capable RF antenna 28, e.g., a PCB trace, loop, or monopole. The control signals 130 of FIG. 1 are then communicated wirelessly or over physical transfer conductors via the energized RF antenna 28 to the RKE system 30 for activation of the door actuator 34 in the exemplary unlocking/locking operation of any of the various doors 50-A, 50-B, 50-C, or 50-D shown in FIG. 1.

Also as shown in FIG. 4, the NFC chipset 20-C may include a low-frequency (LF) antenna 280 coupled to the transmitter chipset 26 or 37. As appreciated in the art, it is customary for "push-button start" functions, in which a driver of the vehicle 42 of FIG. 1 pushes a start button to commence a drive cycle versus turning an ignition key, to arrange such an LF antenna 280 for communication at low frequencies, e.g., 30-300 kHz, with key fobs in the vicinity of the vehicle 42. This enables the microcontroller 25 to know where the key fob resides relative to the vehicle 42. When a key fob is located outside of the vehicle 42, proximity and activation of the key fob allows access to the vehicle 42, with possible drive-disabled starting functions, e.g., to warm up the vehicle 42 on a cold day. When the key fob is inside of the vehicle 42, the low-frequency communication via the LF antenna 280 allows a push-button starting function to proceed, and for the drive cycle to commence. In a similar way, the LF antenna 280 of FIG. 4 informs the microcontroller 25 that the smartphone 12 is presently located inside of the vehicle 42.

Also as part of the present communications strategy, a cloud services public key infrastructure 29 acts as a remote access architecture for embodiments in which the smartphone 12 does more than simply harvest energy for use in the NFC chipset 20-C. The smartphone 12 can, for instance, serve an authentication function using an NFC access application ("app") 33. To that end, the smartphone 12 may be programmed with the NFC access app 33 to work over an internet connection with a cloud services public key infrastructure as shown. Such an arrangement may allow for setup, authentication, and possible access sharing. For instance, a user of the vehicle 42 of FIG. 1 may use the NFC access app 33 to selectively enable one-time or limited duration access to the vehicle 42 by a user of the smartphone 12.

For added security, the NFC chipset 20-C could also include crypto-authentication integrated circuit ("crypto IC") 41 connected to the microcontroller 25. The crypto IC 41 may be used as a trust anchor for low-energy cryptographic operations, such as mutual/two-way authentication between the smartphone 12 and the NFC chipset 20-C, encryption of the public keys from remote access architecture 29, anti-cloning, and other security enhancing features.

Referring to FIG. 5, an alternative NFC chipset 200-C includes some of the components of the NFC chipset 20-C described above with reference to FIG. 4, in particular the inductor coil 21, the NFC receiver IC 22, the microcontroller 25, the RKE UHF transmitter chipset 26 or the BLE transmitter chipset 37, the RF antenna 28, and the LF antenna 280. Additionally, the NFC chipset 200-C may include a charge storage circuit 124, which in turn is controlled by the microcontroller 25 via low-voltage charge control lines 39. While roughly analogous to the storage capacitor block (C1) 24 of FIG. 4, the charge storage circuit 124 adds an element of controllability to the delivery of the induced voltage to the downstream components of the NFC chipset 20-C. Also, an optional DC-DC boost converter 38 may be positioned between the charge storage circuit 124 and the microcontroller 25 in the depicted embodiment, with the DC-DC boost converter 38 likewise available as an option in the NFC chipset 20-C of FIG. 4, although omitted therefrom for illustrative simplicity.

As noted above, it can be desirable to include a permanent standby battery, represented in FIG. 5 as standby battery B1, to reduce latency when an incident energy field is relatively weak. Under such conditions, a user could be required to wait for a longer than expected duration for the capacitor C1 to fully charge, which in turn would manifest as an unacceptable delay when opening the enclosures 40 of FIG. 1. In the exemplary circuit topology of FIG. 5, the standby battery B1 could be connected to respective first and second semiconductor switches Bsw1 and Bsw2, shown in a possible embodiment as switching MOSFETs but implementable in other configurations as, e.g., IGBTs, that allow the microcontroller 25 to determine, for time-based/latency performance reasons, to complete transmit functions using electrical current from the standby battery B1 instead of the capacitor C1.

A representative use scenario for this function would be as follows: if the mobile device 14 (FIG. 1) is used to activate the NFC Entry Device 20, the field strength of the RF signals 120 may be relatively weak in certain instances. A weak incident field would in turn increase the time required to charge the capacitor C1 sufficiently for supplying adequate current to the RKE UHF Transmitter U3. The microcontroller 25 in this case can monitor the voltage Vcharge to determine when the voltage Vcharge is sufficient to energize the transmitter U3. In a case where the time to increase the voltage Vcharge to a sufficient threshold, the microcontroller 25 can selectively connect the standby battery B1, and thus battery voltage Vb, to Vin via the first semiconductor switch Bsw1 using control line BSS, and disconnect the capacitor C1 and its stored voltage Vcap from Vin via the second semiconductor switch Bsw2 using control line CSS. In this manner the microcontroller 25 is able to preserve a remaining charge that is currently stored in the capacitor C1.

Referring briefly to FIG. 9, the circuit of FIG. 5 under weak field conditions may be regulated by the microcontroller 25 in real-time without having to measure the field strength. For instance, the microcontroller 25 may execute computer-readable instructions from non-transitory memory to perform a method 100. An exemplary embodiment of such a method 100 may commence at block 101 with field detection at the onset of energy harvesting. Once the microcontroller 25 boots up/initializes, the microcontroller 25 starts a timer, as represented by "timer=0" in FIG. 9. The method 100 then proceeds to block 102.

At block 102 the microcontroller 25 and/or other suitable circuit components measure a charge stored in the capacitor C1, i.e., Vcharge, for instance using a voltage sensor. The method 100 thereafter proceeds to block 104.

Block 104 entails comparing the measured voltage (Vcharge) from block 102 to a calibrated threshold ("Vcharge>$V_{CAL}$?"). The threshold voltage used in block 104 may be a predetermined voltage level that is considered to be too low for adequate time-based performance of the programmed unlocking/opening of the enclosure(s) 40 shown in FIG. 1. Such a threshold could be determined offline under different field strength conditions to determine a lowest value of Vcharge that would ensure acceptable performance of the unlocking/opening functions described herein. Thus, the actual value used to implement block 104 may vary with the application and the expected end use. In general, however, one might expect a user of the various enclosures 40 of FIG. 1 to expect the enclosure 40 to be unlocked/opened within about 1 second. The method 100 proceeds to block 107 when the capacitor voltage exceeds the calibrated threshold, and to block 105 in the alternative when the capacitor voltage is less than the calibrated threshold.

Block 105 includes comparing the present value of the timer that was previously started at block 101 to a calibrated or predetermined threshold value ("t≥$t_{CAL}$?"). The value used for this comparison may be a predetermined interval considered to be an acceptable delay, i.e., longer than which a user may perceive an unacceptable response lag. As an illustrative non-limiting example, a user entering the enclosure 40 in accordance with the disclosure may expect the enclosure 40 to open within 1 second (s), in which case $t_{CAL}$ could be set to 1s. The method 100 returns to block 102 when the timer has not reached the calibrated time limit ($t_{CAL}$), and to block 106 when the timer reaches or exceeds the calibrated limit ($t_{CAL}$).

Block 107 of FIG. 9 includes discharging the capacitor C1 in the manner described above. The capacitor C1 alone, with its passively-harvested energy, thus powers the RKE UHF transceiver 26 in the non-limiting example embodiment of FIG. 5. The method 100 thereafter returns to block 102.

Block 106 includes activating the first semiconductor switch Bsw1, i.e., closing the first semiconductor switch Bsw1 to connect the standby battery B1, thus providing the battery voltage Vb to Vin, e.g., through an ideal diode FET 36 as shown. The battery voltage Vb may be about 3V in some embodiments, with the battery B1 possibly being a lithium-ion or other application-suitable electrochemical battery cell(s). The method 100 then proceeds to block 108.

At block 108, which in some embodiments may be executed concurrently with block 106, the microcontroller 25 next disconnects the capacitor C1 from Vin by opening the second semiconductor switch Bsw2 via the control line Css. This action preserves a remaining charge in the capacitor C1, thereby minimizing the amount of time that will be needed to fully charge the capacitor C1 to the threshold voltage ($V_{CAL}$) of block 104 once the battery B1 is again disconnected.

Relative to the circuit topology of FIG. 4, the NFC chipsets 200-C of FIG. 5 enables the microcontroller 25 to control the ON/OFF switching state of respective semiconductor switches 51 and 52 (Q1 and Q2) of the charge storage circuit 124, and also of a downstream switch Q3. The switches Q1, Q2, and Q3 may be embodied as field-effect transistors (FETs) as shown or another application-suitable semiconductor switch. A charge voltage ($V_{charge}$) to the optional DC-DC boost converter 38 may be regulated via such switching control, with a current-limiting series resistor R1 possibly disposed immediately downstream of switch Q1. Thus, selective communication by the microcontroller 25 of corresponding ON/OFF state switching control signals to the charge storage circuit 124 enables an electrical charge to be stored in the charge capacitor C1 and released to the downstream RKE UHF transmitter chipset 26 or the BLE transmitter chipset 37 in a coordinated manner, albeit at the expense of additional hardware and programming complexity.

In general, the NFC chipsets 20-C and 200-C of respective FIGS. 4 and 5 as described above use harvested energy from the NFC-enabled smartphone 12 of FIG. 1 to power UHF or BLE signal transmission to the RKE system 30, with signal transmission communicating desired control actions such as UNLOCK or LOCK commands. The RKE UHF transmitter 26 is programmed to the particular enclosure 40, e.g., the vehicle 42 shown in FIG. 1, and thus transmits RF signals 130 to the RF receiver 35 located aboard the vehicle 42 in such an embodiment. NFC capability in this context allows the smartphone 12 or another similarly-configured mobile device to function like a keypad for code entry, or when sending access codes the RKE system 30. Induced energy from the smartphone 12 is rectified to provide a DC voltage to the microcontroller 25 and the RKE UHF transmitter 26 chipset or the BLE transmitter chipset 37, with the microcontroller 25 possibly inclusive of an NFC communication processor and an RKE protocol processor as appreciated in the art.

Harvested DC power is stored in the storage capacitor block 24 of FIG. 4 or the charge storage circuit 124 of FIG. 5 to provide sufficient energy for powering the functions of the microcontroller 25 and related protocol processors thereof for a limited number of transmissions. The optional standby battery B1 of FIG. 5 provides a solution for use conditions in which the incident charging field is of relatively low energy, thereby making it more likely that a user would have to endure prolonged latency. A charge rate of the capacitor C1 may be controlled by microcontroller 25 to reduce loading on the rectified NFC-induced energy. The optional DC-DC boost converter 38 of FIG. 5 may be used in some embodiments when the rectified induced voltage is too low for powering the transmitter chipset 26 or 37.

OPERATIONAL SEQUENCE: exemplary operation of the NFC entry device 20 will now be described with continued reference to the structure of FIGS. 4 and In a possible automotive application, when the NFC entry device 20 first connects to a previously authorized smartphone 12 of FIG. 1, the microcontroller 25 may transmit a unique identifier ("user ID") to the smartphone 12. Such a transmission may be optionally encrypted, e.g., via a crypto IC 41, with a shared key or AES (Advanced Encryption Standard) encryption. In response, the smartphone 12 may scan a programmed list of vehicle IDs to determine whether the smartphone 12 has been paired with the identified vehicle 42. If a programmed vehicle 42 is found, encryption parameters may be used by the smartphone 12 for communication with the NFC entry device 20. In this manner, a given smartphone 12 may be used to control more than one vehicle 42 of the user, without regard for the particular make or model.

Figure 7:
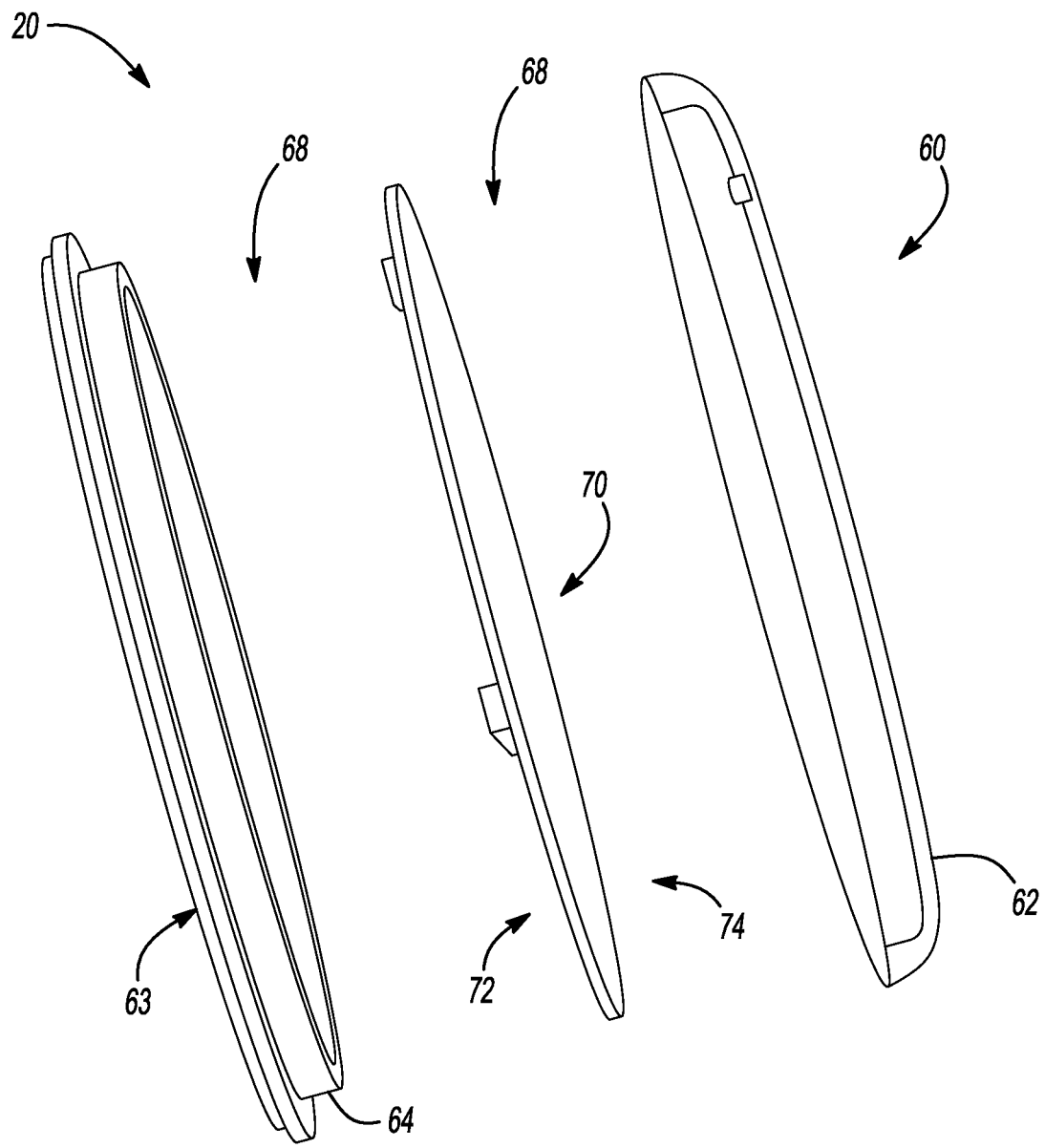
FIG. 7 is a perspective exploded view illustration of the NFC entry device shown in FIGS. 6A and 6B.

Two encryption protocols may be used to optimize security: (1) NFC entry device 20-to-vehicle 42 of FIG. 1, and (2) smartphone 12-to-NFC entry device 20. For protocol (1), an original equipment manufacturer (OEM)-specific RKE protocol may be implemented, such as but not limited to SHARK or EARWIG. The NF entry device 20 emulates a factory key-fob and is programmed to the vehicle 42 using a bar code, which may be included in the housing 60 (FIGS. 7A-8). In this instance, the NFC entry device may transmit a LOCK command to the vehicle 42 if a universal NFC transmission is received by the NFC entry device 20. Such an option may be used for factory programming to the vehicle 42.

With protocol (2), an NFC custom-encrypted protocol may be used in a two-way challenge scenario. A programming card with a QR pairing code may be provided with the NFC entry device 20. Upon transmission, the NFC entry device 20 will learn the key from the smartphone 12 and store the key securely in memory, e.g., in EEPROM. Multiple different NFC devices 20 may be placed on the vehicle 42 in some embodiments, such as on a trunk, hatch, or tailgate (door 50-B of FIG. 1), with each device 20 configured to open only the particular door or other device located in closest proximity. An NFC entry device 20 located on a given side door 50-A may unlock all of the side doors 50-A of the vehicle 42 in some embodiments, or only the driver-side door 50-A in other embodiments.

Various approaches may be used to implement the present teachings in associated software, with the provision of a downloadable software application ("app") being stored on or accessed by the smartphone 12. One option may include opening such an app to cause the smartphone 12 to display a virtual alphanumeric keypad. Upon entry of a code by a user, the smartphone 12 may verify the entry code against a preprogrammed list of entry codes. The user may select an action, such as UNLOCK, LOCK, or TRUNK/HATCH, with UNLOCK being a possible default control action.

Once a desired control action has been selected, the user places the smartphone 12 in close proximity to the installed NFC entry device 20, e.g., by bringing the smartphone 12 in immediate proximity to the B-pillar 54 of FIG. 2. The smartphone 12 automatically transmits an NFC-encrypted command to the NFC entry device 20 as part of the RF signals 120 of FIG. 1. In response, the NFC entry device 20 may verify the command, and may optionally reply with an encrypted challenge to the smartphone 12, e.g., the above-noted and familiar two-factor authentication. Once authenticated, the NFC entry device 20 transmits the encrypted protocol to the vehicle 42, with the above-noted LED annunciator of FIGS. 4 and 5 illuminating to indicate such transmission.

Another option for use of the NFC entry device 20 includes storing an entry code on the smartphone 12. When the smartphone 12 is brought into close proximity to the NFC entry device 20, the smartphone 12 automatically transmits, once again via NFC, an encrypted UNLOCK command to the NFC entry device 20. In response, the NFC entry device 20 verifies the encrypted command, and may respond with a challenge as noted above. Upon authentication, the NFC entry device 20 may transmit the encrypted protocol to the vehicle 42, with the vehicle 42, via the RKE system 30 of FIG. 1, ultimately responding to the command by unlocking the side door 50-A.

Other beneficial capabilities are enabled by the present teachings. For instance, NFC capabilities and the ability to selectively pass photos and/or other data between two NFC-equipped and compatible devices may enable situational sharing of entry codes between two NFC-enabled smartphones 12. This may allow one authorized user, e.g., the owner of the vehicle 42, to allow another user to gain access to the vehicle 42 or other enclosure 40 for a limited window of time before access rights are deleted. As noted above, the NFC entry device 20 may be configured for use with non-vehicular systems such as garage door openers, entry door openers, gates, or other RF-operated devices. This capability allows the smartphone 12 to possibly control multiple different vehicles 42 and/or other similarly equipped enclosures 40 with a single tap of the smartphone 12. In such a scenario, the NFC entry device 20, once woken up by communication with a proximate smartphone 12, would transmit its ID to the smartphone 12 automatically. The smartphone 12 would scan for a matching ID in its memory, and would thereafter transmit an UNLOCK signal in the event of a successful matching result In another possible use scenario, a consumer product card may be provided to a purchaser of the vehicle 42 shown in FIG. 1, with the consumer product card having a multi-digit code for unlocking an administrator app on the smartphone 12. Using such an app and the multi-digit code, the user can pair the smartphone 12 with the NFC entry device 20 as an administrator. Doing this will allow addition or deletion of other smart phones 12. One possible way for adding smartphones 12 is for the administrator app to talk to the NFC entry device 20 and thereby enable addition of smartphones 12. On the administrator app, the user could enter a name or nickname, and then tap the NFC entry device 20. In response, the NFC entry device 20 could send out a multi-digit code to the smartphone 12 of the administrator and prompt for a new user smartphone 12.

A user of the new user smartphone 12 in this scenario would then enter the multi-digit code on the new smartphone 12 and thereafter place the enabled smartphone 12 on the NFC entry device 20 within a certain defined time period, e.g., several minutes or less. The NFC entry device 20 would then store the ID of the newly added smartphone 12 in a password-protected or other secure memory location and verify matching of the multi-digit code. A limited number of encrypted keys may be stored aboard the NFC entry device 20, e.g., 4-5 unique keys for four paired devices, with more or fewer keys being possible in other embodiments. In a dealer scenario, a dealer could connect to the NFC entry device 20 using the dealer's smartphone 12 and enter a secure code for look-up code access. In response, an OEM may provide the above-noted multi-digit code. Such a scenario may help situations in which the above-noted consumer product card is lost or misplaced.

In yet another possible approach, once the user has successfully programmed the NFC entry device 20 to the vehicle 42 and the user's smartphone 12 using separate procedures, encryption to and from the smartphone 12 and the NFC entry device 20 could be used, e.g., AES256 encryption with a rolling code. The crypto IC 41 could also be used within the scope of the disclosure.

VEHICLE UNLOCKING PROCESS: In an exemplary vehicle unlocking process, the user may place the smartphone 12 of FIG. 1 near the NFC entry device 20 to bring the two devices into short range communication with one another. Once such communication has been established, the NFC entry device 20 rectifies the signal 120 and powers the internal circuitry of the NFC receiver 22 shown in FIGS. 4 and 5. For instance, in the architecture of FIG. 5 the regulated output of the NFC receiver IC 22 powers the microcontroller 25 via the diode D3. Switches Q1, Q2, and Q3 at this stage are OFF/not conducting. Also at this point, the transmitter 26 initializes and reads secure EEPROM, e.g., via I2C, for the NFC device ID, and then commands the NFC receiver IC 22 to send the ID to the smartphone 12, possibly via an encrypted NFC transmission.

With respect to operations of the smartphone 12, the smartphone 12 then receives the encrypted NFC device ID from the NFC receiver IC 22. Using previously-stored secret keys on the smartphone 12, the smartphone 12 will successively attempt decryption of the received NFC device ID using its stored secret keys. If the user of the smartphone 12 has selected, via the app, the particular vehicle 42 being communicated with, the decryption will use its secret key first.

Upon successful device ID reception, the smartphone 12 could beep or provide a visual feedback, and then encrypt an action command for transmission to the NFC entry device 20. When the NFC entry device 20 receives the action command, the NFC entry device 20 will automatically decrypt the NFC transmission from the smartphone 12. Using the shared key, the NFC entry device 20 decrypts the transmission and generates an action code, such as UNLOCK, TRUNK/HATCH UNLOCK, SLIDING DOOR, GARAGE, or ENTRY DOOR, etc.

When a valid action code transmission is received, the NFC entry device 20 will next prepare for RKE UHF or BLE transmission. In this case, the microcontroller 25 may turn on switch Q1 of FIG. 5 and begin to charge the storage capacitor C1 through the current-limiting resistor R1 and the reverse blocking diode D1. This charge current is limited when storage capacitor C1 is in a discharged state to avoid pulling down the voltage of the NFC receiver IC 22 and the RKE UHF transmitter chipset 26 or BLE transmitter chipset 37, which would otherwise reset the NFC entry device 20. As part of this process, RKE transmission data is encrypted and data packets are formed for the signal transmission. The transmitter chipset 26 or 37 wakes up and initializes, followed by loading of the encrypted data. The microcontroller 25 monitors the charging voltage $V_{charge}$ on the storage capacitor C1, and will turn on the switch Q2 when the voltage exceeds a reset threshold. Doing this will help speed up the charging time of capacitor C1.

When the charging voltage $V_{charge}$ reaches a full charge, the microcontroller 25 will turn on switch Q3 to connect the storage capacitor C1 to the microcontroller 25 and the transmitter chipset 26 or 37. Optionally, the voltage to the microcontroller 25 and the transmitter chipset 26 or 37 may be modified by operation of the optional buck-boost converter 38 of FIG. 5 to provide a higher voltage, i.e., as a boost converter, or reduce the current draw on the capacitor C1 when operating as a buck converter. Diode D2 prevents a reverse current flow through switch Q3's blocking diode from loading down the NFC receiver IC 22.

The microcontroller 25 then commands the transmitter chipset 26 or 37 to transmit the UHF RKE or BLE RKE data packets, and the NFC entry device 20 sends a transmission status to the smartphone 12. If the first-in/first-out (FIFO) queue of the transmitter 26 is now empty, indicating a successful transmission, the NFC entry device 20 increments its rolling code counter. Upon receipt of the successful status data from the NFC entry device 20, the smartphone 12 could increment a rolling code counter and display success via the touchscreen 15 of FIG. 1 and/or audible feedback. Transmission failure may result in an error with respect to the status data sent to the smartphone 12. In such an event, the smartphone 12 will indicate this via the touchscreen 15 and/or audible feedback. If a status is not returned from the NFC entry device 20 within a defined time period, an error message may be displayed on the touchscreen 15 indicating a loss of communication between the NFC entry device and the smartphone 12.

At the end of the sequence, the NFC entry device 20 will remain in the capacitor charge state as long as power is received. This will allow time for a second transmission if the described vehicle unlock event does not occur, or if an additional command is sent after UNLOCK. The microcontroller 25 of FIGS. 4-6 may set a default status for the switches Q1, Q2, and Q3 being in an OFF state during power up. As will be appreciated, the locking process is the same as the unlocking process described above. However, the smartphone 12 may transmit a LOCK command in the clear, i.e., without encryption or required ID. Such a LOCK command may be initiated from the app.

Figure 6A:
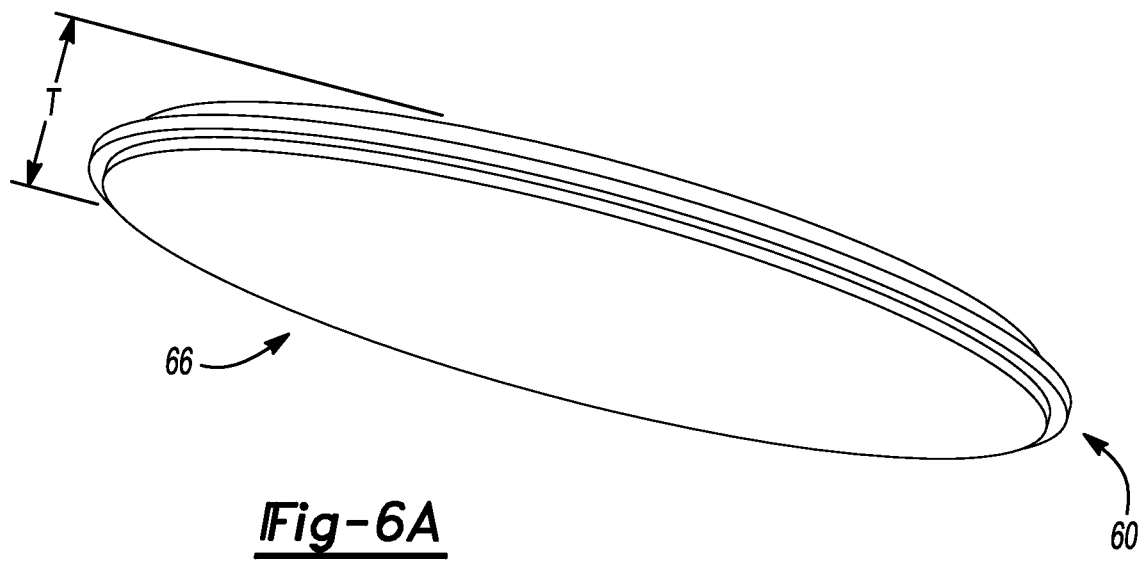
FIGS. 6A and 6B are schematic perspective view illustrations of the NFC entry device according to a possible emblem-based configuration.
Figure 6B:
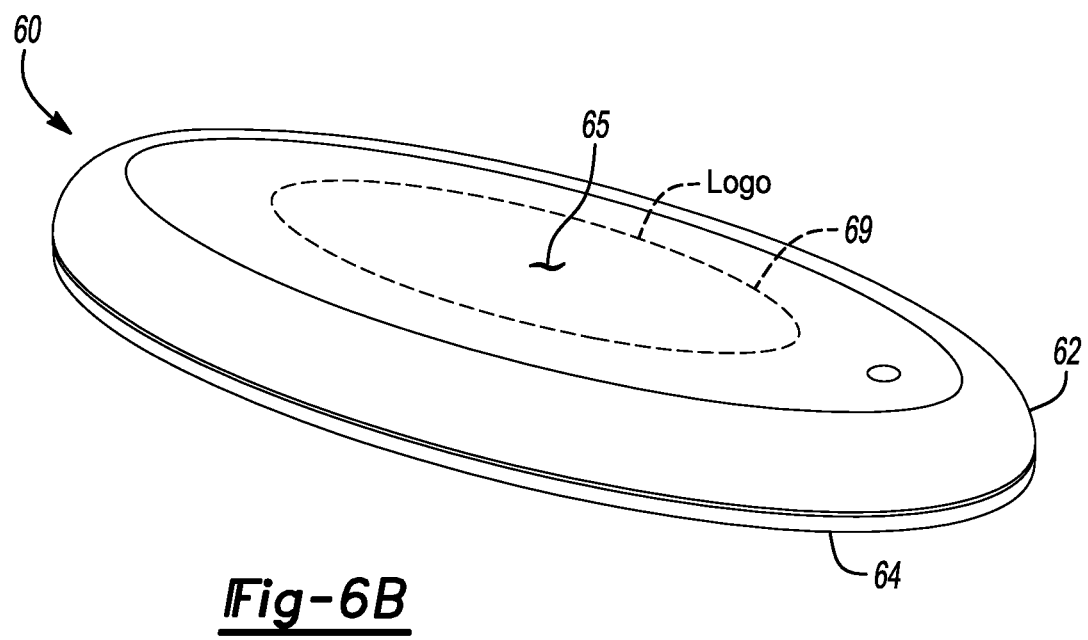

NFC ENTRY DEVICE PACKAGING: Referring now to FIGS. 6A and 6B, the NFC entry device 20 whose passive energy harvesting operation and corresponding structure is described in detail above may, in an exemplary embodiment, include an outer shell or housing 60 configured to securely mount to a surface of the enclosure 40 of FIG. 1. The housing 60 may be constructed from a magnetically-permeable material such as molded plastic, with the housing 60 configured to contain the above-described NFC chipset 20-C or 200-C and protect the constituent circuit elements from moisture and debris. For certain embodiments, such as but not limited to the exemplary automotive use shown in FIGS. 2 and 3, the NFC entry device 20 may be mounted to the vehicle 42 of FIG. 1. Similarly, the NFC entry device 20 may be mounted to the garage 46 or the building 44, or to another enclosure 40 within the scope of the disclosure.

To facilitate secure mounting, a planar base 64 of the housing 60 of a desired shape, e.g., oval having a low-profile thickness T as shown, e.g., 5 mm to 10 mm thick, or rectangular, circular, square, etc., may be at least partially coated with an adhesive layer 66 such as an automotive grade weatherproof two-sided tape. Use of the adhesive layer enables the housing 60 to be securely bonded to the enclosure 40. The housing 60 in this embodiment also includes a cover 62 having an external surface 65. The cover 62 is configured to engage the base 64, such as in a mating snap-fit or other interlocking engagement, with weatherproof adhesives (not shown) possibly used at interfacing surfaces between the cover 62 and the base 64.

Representative embodiments of the cover 62, when the external surface 65 is an exposed show surface, may include a solid color configured to match, complement, or otherwise blend with the enclosure 40 in an aesthetically pleasing manner. Alternatively, the logo 69 may be emblazoned on or adhered to the external surface 65. Such an embodiment may help blend the housing 60 seamlessly with the design of the enclosure e.g., by enabling the housing 60 to function as a badge or other trim piece. Attachment via the base 64 to the enclosure 40 proximate the particular door 50-A, 50-B, or 50-D being accessed further facilitates the intended functionality of the NFC chipset 20-A or 200-A within the housing 60.

Referring briefly to FIG. 7, the housing 60 shown in FIGS. 6A and 6B may in some embodiments have a clamshell configuration in which the cover 62 and the base 64 snap together or otherwise mutually engage to encapsulate a printed circuit board assembly (PCBA) 70 in a cavity 68 of the housing 60. The above-described NFC chipset 20-A and 200-A of FIGS. 4 and 5, respectively, possibly as constructed in the FIG. 7 schematic, may be constructed on the PCBA 70 enclosed within the cavity 68. As shown, the PCBA 70 includes opposing/oppositely-disposed respective first and second major surfaces 72 and 74.

To facilitate RF communication to and from the NFC entry device 20 within the cavity 68, the first major surface 72 should be arranged to face the base 64, with the diametrically opposing second major surface 74 facing the cover 62. Such an orientation is advantageous to RF transmission between the NFC-enabled smartphone 12 of FIG. 1 and the NFC entry device 20, allowing for optimal signal strength and passive energy harvesting. An underside 63 of the base 64 may be adhered to a surface, e.g., via a weather resistant adhesive material such as a double-side automotive grade tape, epoxy, etc.

As shown in FIGS. 8A and 8B, the first major surface 72 of the PCBA 70 includes the various hardware components 75 of the NFC chipset 20-C or 200-C shown in FIGS. 4 and 5, respectively. Such components 75, which may be surface mounted or otherwise attached to an FR4 or other suitable substrate 73 and foil layers or traces (not shown), may include the above-described chipset 26 or 37, the diodes D0, D1, D2, and D3, the semiconductor switches Q1, Q2, and Q3, storage capacitor C1, the microcontroller 25, memory (M), resistors R1 and R2, etc., with the particular sizes, shapes, and arrangements shown in FIGS. 8A and 8B being representative of the present teachings and thus non-limiting.

As shown in FIG. 8B, the second major surface 74 may be used to mount the inductor coil 21 and the RF antenna 28. Such an installed position adjacent to the cover 62 of FIG. 7 minimizes signal interference by the materials of the enclosure 40. For example, in the installed automotive location on or within the B-pillar 54 of FIGS. 2 and 3, the metal structure of the B-pillar 54 of FIG. 2 can interfere with transmission of the RF signals 120 and 130 of FIG. 1. Thus, construction of the housing 60 should consider the adverse shielding effects of ferromagnetic materials located in close proximity to the NFC chipset 20-C or 200-C, with sufficient standoff space or separation from such surfaces of the enclosure 40 being provided.

Those skilled in the art will recognize that other methods are possible within the scope of the forgoing disclosure. For example, a method of unlocking a door 50-A, 50-C, or 50D of an enclosure 40 having the door actuator 34 and RKE control unit 32 of FIG. 1, when the enclosure 40 is not equipped with the optional alphanumeric keypad 11 of FIG. 2, or when the user does not wish to use such a keypad 11 if so equipped, may include establishing NFC between the NFC entry device 20 mounted to the enclosure 40 and an external NFC-enabled mobile device, e.g., the smartphone 12. Such a method may include confirming, via the NFC device 20, that the NFC-enabled mobile device 12 is an approved device. In response to confirming that the NFC-enabled mobile device 12 is an approved device, the method may include inducing an electric current in the inductor coil 21 of the NFC chipset 20-C or 200-C, via electromagnetic induction, using the RF signal 120 from the NFC-enabled mobile device 12.

As specified above, the method includes storing energy in the capacitor C1 of the NFC chipset 20-C or 200-C as passively harvested energy. Thereafter, the method proceeds by selectively powering the antenna 28 of the transmitter chipset, i.e., 26 or 37 of FIGS. 4 and 5. This occurs using the energy in the capacitor C1 to transmit the control signal 130 to the RF receiver 35, with the control signal 130 being indicative of a request to unlock the door 50-A, 50-B, 50-C, or 50-D.

In the disclosed representative embodiments, the enclosure 40 is a vehicle body having a plastic cover 56 attached to a metal B-pillar 54, with the method in such a configuration including mounting the NFC entry device 20 between the plastic cover 56 and the metal B-pillar 54. Other approaches include attaching the logo 65 of FIG. 6B to the NFC entry device 20 and mounting the NFC entry device 20 to an exposed show surface, e.g., of the vehicle 42.

Continuing with the discussion of a possible embodiment of the method, the act of powering the RF antenna of the RF transmitter chipset may include selectively powering a UHF chipset or a BLUETOOTH Low-Energy (BLE) chipset, and possibly encrypting communications between the NFC entry device 20 and the NFC-enabled mobile device 12 using the crypto-authentication IC 41. Other implementations of the method include connecting the DC-DC converter 38 to the capacitor C1 and to the microcontroller 25, and adjusting a voltage output from the capacitor C1 via the DC-DC converter 38 using the microcontroller 25.

In other approaches, the method may include transmitting a set of charge control signals from the microcontroller 25 to the semiconductor switches Q1, Q2, and Q3 connected to the capacitor C1. In response to the set of charge control signals, such a method may include using the semiconductor switches Q1, Q2, and Q3 to deliver the energy to the RF transmitter 26 or 37. The method may also include selectively permitting access to the enclosure 40 by the NFC-enabled mobile device 20 via the microcontroller 25 using the cloud services public key infrastructure 29 and the NFC access app 33 described above.

While the scenarios described above largely pertain to unlocking actions, whether by a user in proximity to an enclosure 40 or by permitting remote access to the enclosure 40 by another user, those skilled in the art will appreciate that the permitted control actions may vary with the intended application. For example, the control action could be an engine ignition or an electric/hybrid electric powertrain start event. An illustration is the case of ride/car sharing application in which the above-described sequence could be adapted for use in enabling the start event to occur for a specific duration of time, e.g., after receipt of an authorization signal, perhaps allowing a one-time start. Such an option could be programmed into the control software of the motor vehicle to work seamlessly with the app, such that a user in a ride share scenario could be selectively permitted to start the vehicle a predetermined number of times before authorization is once again required.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A near-field communication (NFC) entry device for remote keyless entry (RKE) into a passenger compartment of a vehicle having a body, an RKE control unit, a door providing ingress to the passenger compartment, and a door actuator configured to unlock and lock the door, the NFC entry device comprising:
 a housing defining a cavity and configured to mount to the body of the vehicle; and
 a printed circuit board assembly (PCBA) enclosed within the cavity, comprising:
  a radio frequency (RF) transmitter chipset having an RF antenna coupled thereto;
  an inductor coil;
  an NFC receiver integrated circuit (IC) coupled to the inductor coil, and including a steering diode and a voltage regulator;
  a capacitor coupled to the NFC receiver IC; and
  a microcontroller connected to the NFC receiver IC and the capacitor, wherein the NFC entry device is configured to passively harvest energy from an NFC-enabled mobile device in proximity to the NFC entry device, via the inductor coil by operation of the microcontroller, store the energy in the capacitor, and to thereafter selectively use the energy stored in the capacitor to communicate an access control signal to the RKE control unit via the RF antenna and thereby activate the door actuator.

2. The NFC entry device of claim 1, further comprising a standby battery, wherein the microcontroller is configured to selectively communicate the access control signal to the RKE control unit when a voltage level of the capacitor is less than a calibrated threshold voltage.

3. The NFC entry device of claim 2, further comprising first and second semiconductor switches arranged between the capacitor and the microcontroller, wherein the microcontroller is configured to connect the standby battery to the RF transmitter chipset via the first semiconductor switch and to disconnect the capacitor from the RF transmitter chipset via the second semiconductor switch.

4. The NFC entry device of claim 1, wherein the NFC entry device is integrated into an alphanumeric keypad.

5. The NFC entry device of claim 1, wherein the RF transmitter chipset includes an ultra-high frequency (UHF) chipset or a BLUETOOTH low-energy (BLE) chipset.

6. The NFC entry device of claim 1, further comprising a DC-DC converter coupled to the capacitor and the microcontroller.

7. The NFC entry device of claim 1, wherein the microcontroller is configured to selectively permit access to the enclosure by the NFC-enabled mobile device via a cloud services public key infrastructure and an NFC access application ("app").

8. The NFC entry device of claim 1, further comprising a low-frequency (LF) antenna connected to the RF transmitter chipset, and configured to selectively enable a push-button start function of the vehicle when the NFC-enabled mobile device is present within the passenger compartment.

9. A method of unlocking a door of a vehicle having a body, the door, a door actuator, and a remote keyless entry (RKE) control unit, the method comprising:
   inducing an electric current in an inductor coil of an NFC chipset of an NFC entry device, via electromagnetic induction, using an NFC signal from an external NFC-enabled mobile device, wherein the NFC entry device is mounted to the body and includes an NFC receiver integrated circuit (IC) that is coupled to the inductor coil, and wherein the NFC receiver IC includes a steering diode and a voltage regulator;
   storing energy in a capacitor of the NFC chipset of the NFC entry device as passively harvested energy, the capacitor being coupled to the NFC receiver IC;
   establishing near-field communication (NFC) between the NFC entry device and the external NFC-enabled mobile device;
   confirming, via the NFC entry device, that the external NFC-enabled mobile device is an approved device;
   in response to confirming that the external NFC-enabled mobile device is the approved device, selectively powering a radio frequency (RF) antenna of an RF transmitter chipset of the NFC chipset using the energy in the capacitor, via a microcontroller connected to the NFC receiver IC and the capacitor, when a voltage level of the capacitor exceeds a calibrated threshold voltage to thereby transmit a control signal to the RKE control unit, the control signal being indicative of a request to unlock the door from a previously locked state.

10. The method of claim 9, further comprising selectively powering the RF antenna of the RF transmitter chipset using a battery voltage from a standby battery when the voltage level of the capacitor is less than the calibrated threshold voltage.

11. The method of claim 10, further comprising:
   connecting the standby battery to the RF transmitter chipset via a first semiconductor switch and disconnecting the capacitor from the RF transmitter chipset via a second semiconductor switch when the voltage level of the capacitor is less than the calibrated threshold voltage.

12. The method of claim 11, wherein the first and second semiconductor switches include first and second MOSFETs.

13. The method of claim 9, wherein the step of selectively powering the RF antenna of the RF transmitter chipset includes selectively powering an ultra-high frequency (UHF) chipset or selectively powering a BLUETOOTH Low-Energy (BLE) chipset.

14. The method of claim 9, further comprising:
   encrypting communications between the NFC entry device and the NFC-enabled mobile device using a crypto-authentication integrated circuit.

15. The method of claim 9, further comprising:
   connecting a DC-DC converter to the capacitor and to the microcontroller; and
   adjust a voltage output from the capacitor via the DC-DC converter using the microcontroller.

16. The method of claim 9, further comprising:
   transmitting a set of charge control signals from the microcontroller to a plurality of semiconductor switches connected to the capacitor; and
   in response to the set of charge control signals, using the semiconductor switches to deliver the energy to the RF transmitter.

17. The method of claim 9, further comprising:
   selectively permitting access to the enclosure by the NFC-enabled mobile device via the microcontroller using a cloud services public key infrastructure and an NFC access application ("app").

18. The method of claim 9, wherein the NFC entry device is integrated into an alphanumeric keypad, and wherein inducing the electric current in the inductor coil of the NFC chipset occurs within the NFC entry device of the alphanumeric keypad.

19. A system for remote keyless entry (RKE) into a vehicle having an RKE control unit, a body, a door, and a door actuator configured to unlock and lock the door, the system comprising:
   (i) a near field communication (NFC) entry device configured to permit ingress to and egress from the vehicle via the door in a first manner, the NFC entry device comprising:
      a housing defining a cavity and configured to mount to the body of the vehicle; and
      a printed circuit board assembly (PCBA) enclosed within the cavity, comprising:
         a radio frequency (RF) transmitter chipset having an RF antenna;
         an inductor coil;
         an NFC receiver integrated circuit (IC) coupled to the inductor coil, and including a steering diode and a voltage regulator;
         a capacitor coupled to the NFC receiver IC;
         a standby battery;
         a first semiconductor switch;
         a DC-DC converter coupled to the capacitor; and
         a microcontroller connected to the NFC receiver IC, the capacitor, and the first semiconductor switch, wherein the NFC entry device is configured to passively harvest energy from an NFC-enabled mobile device in proximity to the NFC entry device, via the inductor coil by operation of the microcontroller, store the energy in the capacitor, and thereafter selectively use the energy in the capacitor when a voltage level of the capacitor exceeds a calibrated threshold voltage to communicate an access control signal to the RKE control unit via the RF antenna and thereby activate the door actuator, and to direct battery energy stored in the standby battery through the first semiconductor switch to thereby communicate the access control signal to the RKE control unit via the RF antenna when the voltage level of the capacitor is less than the calibrated voltage level; and (ii) an alphanumeric keypad connected to the body of the vehicle and connected to the RKE control unit, the alphanumeric keypad being configured to permit ingress to and egress from the vehicle via the door in a second manner.

20. The system of claim 19, further comprising a second semiconductor switch, wherein the microcontroller is configured to disconnect the capacitor from the RF transmitter by opening the second semiconductor switch when the voltage level of the capacitor is less than the calibrated voltage level.

* * * * *